(12) United States Patent
Kameda et al.

(10) Patent No.: US 7,692,896 B2
(45) Date of Patent: Apr. 6, 2010

(54) PERPENDICULAR MAGNETIC RECORDING HEAD HAVING RETURN PATH LAYER AND GAP ADJUSTING LAYER

(75) Inventors: Hiroshi Kameda, Niigata-ken (JP); Hisayuki Yazawa, Niigata-ken (JP)

(73) Assignee: TDK Corporation, Tokyo (JP)

( * ) Notice: Subject to any disclaimer, the term of this patent is extended or adjusted under 35 U.S.C. 154(b) by 887 days.

(21) Appl. No.: 11/460,922

(22) Filed: Jul. 28, 2006

(65) Prior Publication Data

US 2007/0041127 A1 Feb. 22, 2007

(30) Foreign Application Priority Data

Aug. 19, 2005 (JP) ............................. 2005-238912

(51) Int. Cl.
 *G11B 5/147* (2006.01)
(52) U.S. Cl. ................................................. 360/125.12
(58) Field of Classification Search ............ 360/125.12, 360/125.26, 125.09, 125.03, 125.13, 317
 See application file for complete search history.

(56) References Cited

U.S. PATENT DOCUMENTS

| | | | | |
|---|---|---|---|---|
| 6,831,314 B2* | 12/2004 | Higo et al. | ................... | 257/295 |
| 6,972,992 B1* | 12/2005 | Fukuzumi et al. | ........... | 365/173 |
| 7,084,447 B2* | 8/2006 | Fukuzumi et al. | ........... | 257/295 |
| 7,457,080 B2* | 11/2008 | Watabe et al. | .......... | 360/125.12 |
| 7,508,630 B2* | 3/2009 | Matono | ................. | 360/125.02 |
| 2004/0001372 A1* | 1/2004 | Higo et al. | ................... | 365/200 |
| 2004/0042129 A1* | 3/2004 | Mizuguchi et al. | ........ | 360/324.2 |
| 2006/0017082 A1* | 1/2006 | Fukuzumi et al. | ........... | 257/295 |
| 2006/0125034 A1* | 6/2006 | Ohba et al. | .................. | 257/421 |
| 2006/0187703 A1* | 8/2006 | Mizuguchi et al. | .......... | 365/158 |
| 2007/0030602 A1* | 2/2007 | Matono | ..................... | 360/317 |
| 2007/0195456 A1* | 8/2007 | Kameda et al. | ............. | 360/126 |
| 2007/0211384 A1* | 9/2007 | Hsiao et al. | ................. | 360/126 |
| 2008/0278862 A1* | 11/2008 | Kameda et al. | ............. | 360/319 |
| 2009/0027810 A1* | 1/2009 | Horng et al. | ............. | 360/324.2 |
| 2009/0096043 A1* | 4/2009 | Min et al. | .................... | 257/421 |

FOREIGN PATENT DOCUMENTS

| | | |
|---|---|---|
| JP | 62-159313 | 7/1987 |
| JP | 2001-266310 | 9/2001 |
| JP | 2005-101245 | 4/2005 |

* cited by examiner

*Primary Examiner*—Allen T Cao
(74) *Attorney, Agent, or Firm*—Brinks Hofer Gilson & Lione

(57) ABSTRACT

A perpendicular magnetic recording head includes a main pole layer and a return path layer that are exposed from a medium-facing surface of the recording head facing a recording medium and that face each other with a predetermined gap therebetween at the medium-facing surface. A coil layer applies a recording magnetic field to the main pole layer and the return path layer. The return path layer includes a gap adjusting layer and a main layer stacked in that order from a side facing the main pole layer. The gap adjusting layer is positioned so as to face the main pole layer and the recording medium, and is made of a magnetic material having a resistivity lower than resistivities of the main layer and the main pole layer.

16 Claims, 5 Drawing Sheets

PERPENDICULAR MAGNETIC RECORDING HEAD HAVING RETURN PATH LAYER AND GAP ADJUSTING LAYER

This application claims the benefit of Japanese Patent Application No. 2005-238912 filed on Aug. 19, 2005 which is hereby incorporated by reference.

BACKGROUND

1. Field

A perpendicular magnetic recording head is provided. The magnetic recording head performs recording by applying a perpendicular magnetic field to a surface of a recording medium.

2. Related Art

Magnetic heads are classified into a longitudinal recording (in-plane recording) head that performs recording by applying a parallel magnetic field to a surface of a recording medium, and a perpendicular recording magnetic head that performs recording by applying a perpendicular magnetic field to a surface of a recording medium. A perpendicular recording magnetic head is advantageous because of increased recording density.

Generally, a medium-facing surface of a perpendicular magnetic recording head facing a recording medium, a main pole layer and a return path layer are stacked with a nonmagnetic insulating layer disposed therebetween. The main pole layer and the return path layer are magnetically connected in a section at a distance from the medium-facing surface in the height direction. A coil layer is provided in the nonmagnetic insulating layer to apply a recording magnetic field to the main pole layer and the return path layer. When a recording magnetic field is induced between the main pole layer and the return path layer by applying a current to the coil layer, it perpendicularly enters a hard film of the recording medium through a leading end face of the main pole layer exposed from the medium-facing surface, passes through a soft film of the recording medium, and then returns into the return path layer. Magnetic recording is thereby conducted on a portion of the recording medium facing the main pole layer. Perpendicular magnetic recording heads of this type are disclosed in Japanese Unexamined Patent Application Publication Nos. 62-159313, 2001-266310, and 2005-101245.

Recently, the distance between the main pole layer and the return path layer at the medium-facing surface of the perpendicular magnetic recording head; namely, the gap, is commonly set to a small value of approximately 50 nm (shielded pole structure). By adopting such a small gap, magnetic flux that flows from the main pole layer to the return path layer increases, and the inclination of a recording magnetic field, which is emitted from the main pole layer, passes through the recording medium and returns to the return path layer, (magnetic field inclination) increases. This achieves magnetic recording with little fringing. When the magnetic flux that flows from the main pole layer to the return path layer increases, magnetic flux leaking from the main pole layer toward the recording medium is reduced, and the strength of a recording magnetic field decreases. Since the magnetic field inclination increases, the SN ratio is maintained.

When the strength of the recording magnetic field is low, it may be impossible to record on a recording medium having a great coercive force. Moreover, since the writing track width tends to depend on the frequency of a current flowing through the coil layer in the perpendicular magnetic recording head, it is reduced in high-frequency recording. This sometimes reduces and the SN ratio.

SUMMARY

A high-performance perpendicular magnetic recording head is provided.

The present invention has been made in view of the followings: First, magnetic flux leaking from a main pole layer to a recording medium is increased by increasing the gap. Secondly, the gap is virtually increased by decreasing the magnetic permeability of a side of a return path layer facing the main pole layer. Thirdly, when the return path layer has a multilayer structure and a magnetic layer having the lowest resistivity is disposed on a side of the return path layer facing the main pole layer, the magnetic permeability of the side is decreased by an eddy current loss produced by high-speed polarity inversion of the recording magnetic field.

A perpendicular magnetic recording head according to a preferred embodiment includes a main pole layer exposed from a medium-facing surface of the head facing a recording medium, a return path layer exposed from the medium-facing surface and facing the main pole layer with a predetermined gap therebetween at the medium-facing surface, and a coil layer for applying a recording magnetic field to the main pole layer and the return path layer. The return path layer includes a gap adjusting layer and a main layer stacked in that order from a side facing the main pole layer. The gap adjusting layer is positioned so as to face the main pole layer and the recording medium, and is made of a magnetic material having a resistivity lower than resistivities of the main layer and the main pole layer.

It is practical that the gap adjusting layer has a thickness of 300 nm or less. An effect obtained when the thickness of the gap adjusting layer exceeds 300 nm is substantially identical to that obtained when the thickness is 300 nm or less.

The preferred embodiment have considered that magnetic flux leaking from a main pole layer to a recording medium is increased by increasing the gap. The gap is virtually increased by decreasing the magnetic permeability of a side of a return path layer facing the main pole layer. When the return path layer has a multilayer structure and a magnetic layer having the lowest resistivity is disposed on a side of the return path layer facing the main pole layer, the magnetic permeability of the side is decreased by an eddy current loss produced by high-speed polarity inversion of the recording magnetic field.

In the perpendicular magnetic recording head of a preferred embodiment, as the frequency of a current flowing through the coil layer increases, the magnetic permeability of the gap adjusting layer decreases, and the gap is virtually increased. Therefore, the strength of a recording magnetic field can be increased without decreasing the inclination of the recording magnetic field, and a high SN ratio can be obtained even during high-frequency recording. This enhances recording performance of the perpendicular magnetic recording head.

DRAWINGS

DESCRIPTION OF THE PREFERRED EMBODIMENTS

Figure 1:
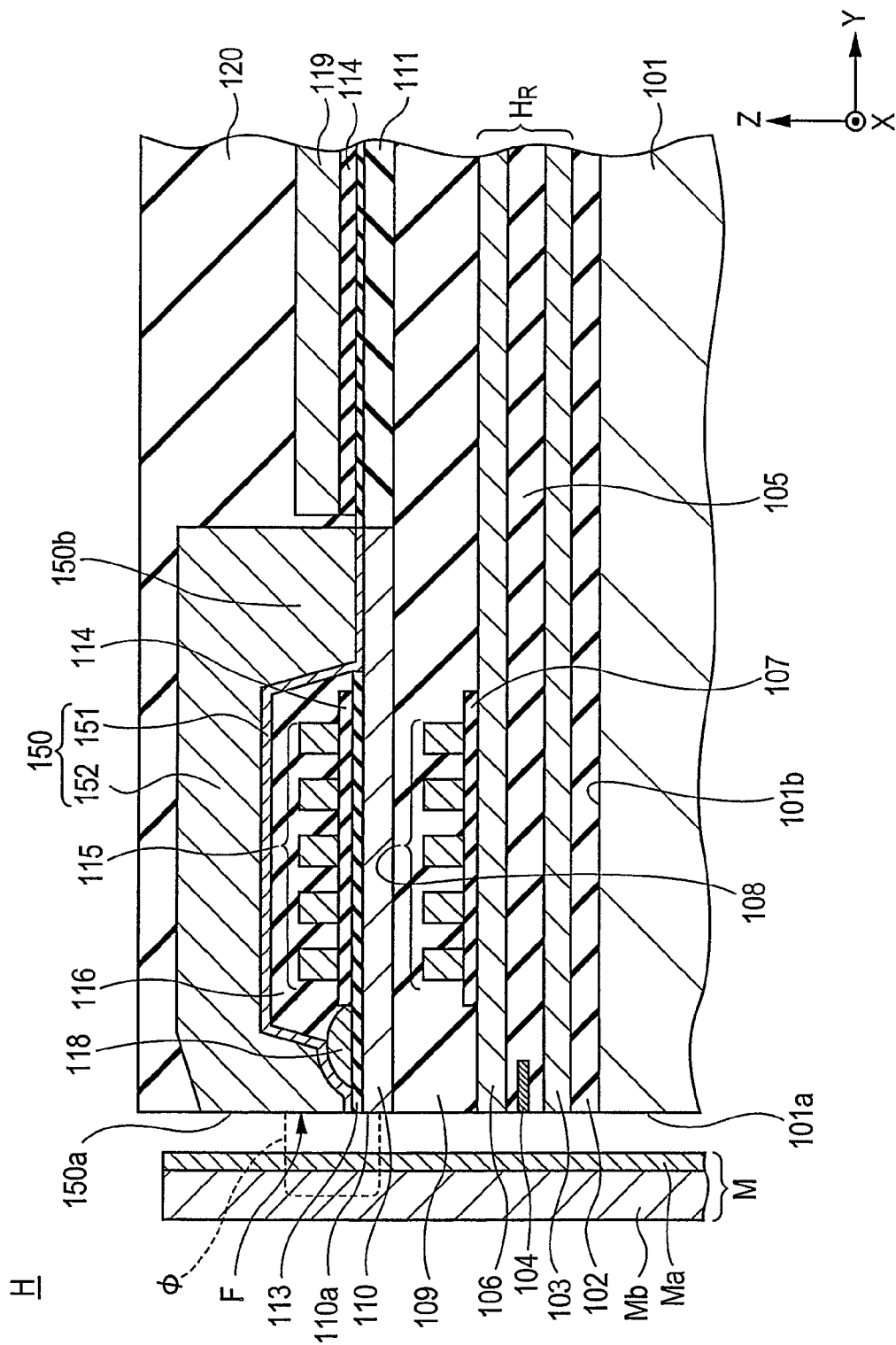
FIG. 1 is a partial longitudinal sectional view that shows the overall configuration of a perpendicular magnetic recording head according to a preferred embodiment
Figure 2:
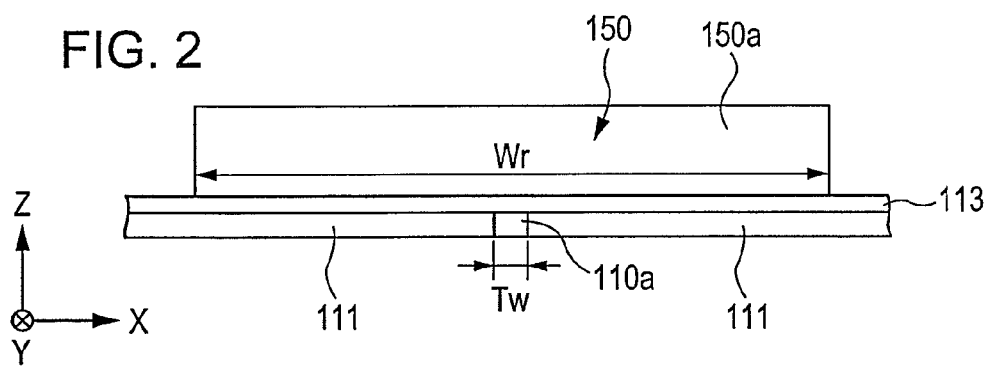
FIG. 2 is a partial front view of the perpendicular magnetic recording head.
Figure 3:
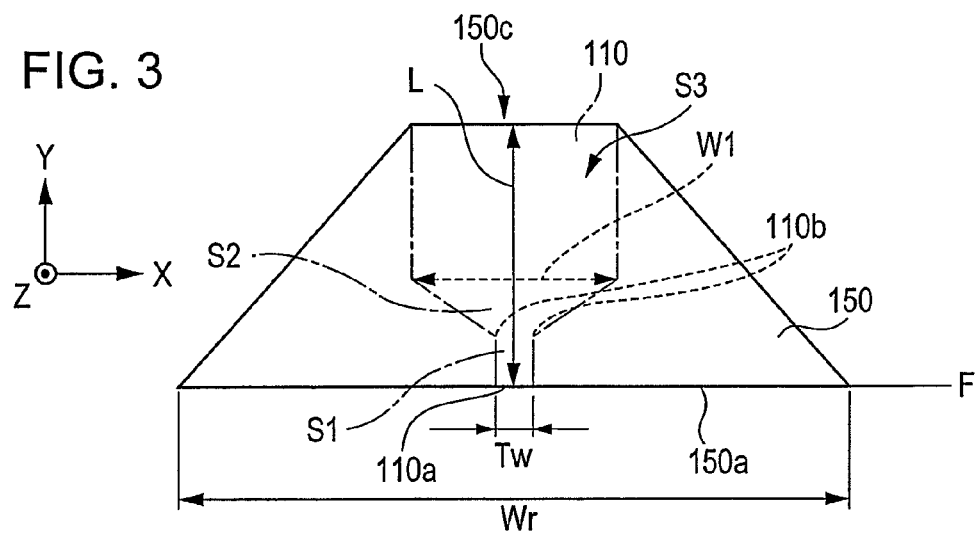
FIG. 3 is a partial plan view of the perpendicular magnetic recording head.

FIG. 1 is a partial longitudinal sectional view that shows the overall configuration of a perpendicular magnetic recording head according to a preferred embodiment, FIG. 2 is a partial front view of the perpendicular magnetic recording head, and FIG. 3 is a partial plan view of the perpendicular magnetic recording head. In FIGS. 1 to 3, the X-direction, the Y-direction, and the Z-direction are respectively defined as a track width direction, a height direction (direction of leaking of a magnetic field from a recording medium M), and a moving direction of the recording medium M.

A perpendicular magnetic recording head H of this embodiment applies a perpendicular magnetic field to the recording medium M to perpendicularly magnetize a hard film Ma of the recording medium M. In the recording medium M, the hard film Ma having a large residual magnetization is disposed on a side close to the recording head H, and a soft film Mb having a high magnetic permeability is disposed on a side remote from the recording head H. The recording medium M is shaped like, for example, a disc, and is rotated about the center of the disc.

A slider 101 is made of a nonmagnetic material, for example, $Al_2O_3TiC$, and a medium-facing surface 101a of the slider 101 faces the recording medium M. When the recording medium M is rotated, the slider 101 flies above a surface of the recording medium M because of an air flow produced on the surface, or the slider 101 slides on the recording medium M.

A nonmagnetic insulating layer 102 of an inorganic material, for example, $Al_2O_3$ or $SiO_2$, is provided on a trailing end face 101b of the slider 101. A reading section $H_R$ is provided on the nonmagnetic insulating layer 102.

The reading section $H_R$ includes a lower shield layer 103, an upper shield layer 106, an inorganic insulating layer (gap insulating layer) 105 provided between the lower shield layer 103 and the upper shield layer 106, and a reading element 104 provided in the inorganic insulating layer 105. The reading element 104 is a magnetoresistive element such as an AMR element, a GMR element, or a TMR element.

A plurality of first coil layers 108 made of a conductive material are provided on the upper shield layer 106 with a coil insulating underlayer 107 disposed therebetween. The first coil layers 108 are made of, for example, one of or two or more of nonmagnetic metal materials of Au, Ag, Pt, Cu, Cr, Al, Ti, NiP, Mo, Pd, and Rh. Alternatively, the first coil layers 108 may have a multilayer structure in which these nonmagnetic metal materials are stacked. A coil insulating layer 109 made of an inorganic insulating material, such as $Al_2O_3$, or an organic insulating material, such as a resist, is provided around the first coil layers 108.

An upper surface of the coil insulating layer 109 is flattened. A seed layer (not shown) is provided on the flat surface of the coil insulating layer 109, and a main pole layer 110 is provided on the seed layer. The main pole layer 110 has a predetermined length L from a surface F facing the recording medium M (hereinafter simply referred to as a facing surface F) in the Y-direction (height direction), and a leading end face 110a of the main pole layer 110 exposed from the facing surface F has a width in the X-direction (track width direction) that is defined as the track width Tw. For example, the main pole layer 110 is formed of a ferromagnetic material having a high saturation magnetic flux density, such as Ni—Fe, Co—Fe, or Ni—Fe—Co, by plating.

As shown in FIG. 3, the main pole layer 110 includes a front portion S1 including the leading end face 110a and having the width in the track width direction that is defined as the track width Tw, an inclined portion S2 that extends from a base end 110b of the front portion S1 in the Y-direction so that its width W1 in the X-direction gradually increases from the track width Tw, and a rear portion S3. More specifically, the track width Tw is within the range of about 0.01 to 0.5 μm, and the length of the front portion S1 in the height direction is within the range of about 0.01 to 0.5 μm. The width W1 of the rear portion S3 in the X-direction is approximately 0.1 to 1000 μm at the widest portion, and the lengths of the inclined portion S2 and the rear portion S3 in the Y-direction are approximately 0.1 to 1000 μm.

A first insulating layer 111 is provided on both sides in the X-direction and on the rear side in the Y-direction of the main pole layer 110. For example, the first insulating layer 111 is made of, for example, $Al_2O_3$, $SiO_2$, or Al—Si—O. A gap layer 113 made of a nonmagnetic inorganic insulating material, such as alumina or $SiO_2$, is provided on the main pole layer 110 and the first insulating layer 111. Second coil layers 115 are provided on the gap layer 113 with a coil insulating underlayer 114 disposed therebetween. Similarly to the first coil layers 108, a plurality of second coil layers 115 are made of a conductive material. The second coil layers 115 are made of at least one of nonmagnetic metal materials such as Au, Ag, Pt, Cu, Cr, Al, Ti, NiP, Mo, Pd, and Rh. Alternatively, the second coil layers 115 may have a multilayer structure in which these nonmagnetic metal materials are stacked.

Ends of the first coil layers 108 and the second coil layers 115 in the track width direction (X-direction) are electrically connected in a toroidal form. The form of the coil layers (magnetic-field producing means) is not particularly limited to the toroidal form.

A coil insulating layer 116 made of an inorganic material, such as $Al_2O_3$, or an organic material, such as a resist, is provided around the second coil layers 115. A return path layer 150 made of a ferromagnetic material, such as permalloy, is provided over the coil insulating layer 116 and the gap layer 113. The return path layer 150 has a leading end face 150a exposed from the facing surface F, and leading end face 150a faces the main pole layer 110 at the facing surface F so that a gap G is provided therebetween. A rear end portion of the return path layer 150 in the height direction serves as a connecting portion 150b connected to the main pole layer 110. A gap-depth determining layer 118 made of an inorganic or organic material is provided on the gap layer 113 and at a predetermined distance from the facing surface F. The distance from the facing surface F to a front end of the gap-depth determining layer 118 defines the gap depth of the perpendicular magnetic recording head H.

A lead layer 119 extending from the second coil layers 115 is provided behind the return path layer 150 in the height direction with the coil insulating underlayer 114 disposed therebetween. The return path layer 150 and the lead layer 119 are covered with a protective layer 120 made of, for example, an inorganic nonmagnetic insulating material.

As shown in FIG. 2, the thickness of the leading end face 110a of the main pole layer 110 is smaller than the thickness of the leading end face 150a of the return path layer 150, and the width Tw of the leading end face 110a in the track width direction (X-direction) is sufficiently smaller than the width Wr of the leading end face 150a in the same direction. For example, the area of the leading end face 110a is sufficiently smaller than the area of the leading end face 150a on the facing surface F. Therefore, magnetic flux ϕ of a leakage recording magnetic field concentrates at the leading end face 110a of the main pole layer 110, and perpendicularly magnetizes the hard film Ma of the recording medium M, thus recording magnetic data.

Figure 4A:
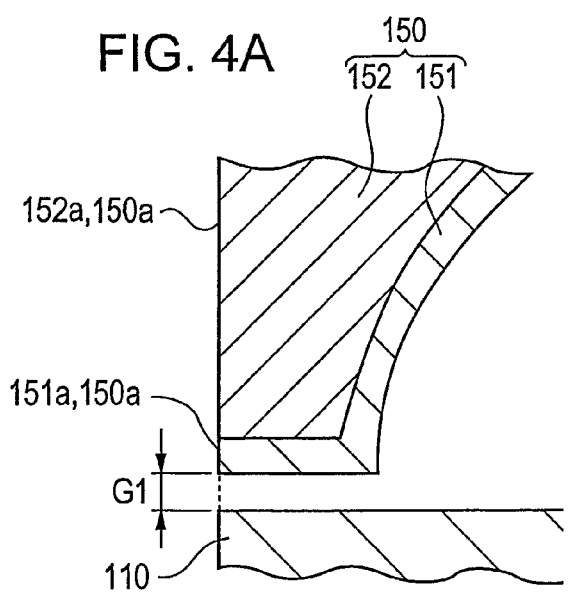
FIGS. 4A and 4B are schematic sectional views that show the operation of a gap adjusting layer, respectively, during low-frequency recording and high-frequency recording.

In the perpendicular magnetic recording head H having the above-described overall configuration, the return path layer 150 has a two-layer structure in which a gap adjusting layer 151 and a main layer 152 are stacked from a side facing the main pole layer 110, as shown in FIG. 4A serving as an enlarged view.

The main layer 152 has a leading end face 152a exposed from the facing surface F, and the leading end face 152a receives magnetic flux ϕ of a recording magnetic field that is emitted from the main pole layer 110 to the recording medium M and returns after passing through the recording medium M (coupling). The main layer 152 is made of a soft magnetic material, such as NiFe, having a resistivity lower than that of the main pole layer 110, and is approximately 0.1 to 5 μm, more practically, approximately 1.5 to 2 μm in thickness. In this embodiment, the main layer 152 is, for example, a $Ni_{30}Fe_{70}$ alloy film formed by plating.

The gap adjusting layer 151 serves to virtually make an automatic adjustment to the gap G in accordance with the frequency of a current flowing through the coil layers 108 and 115. The gap adjusting layer 151 is provided directly under the main layer 152, and faces the recording medium M and the main pole layer 110. A leading end face 151a of the gap adjusting layer 151 forms a flat face with the leading end face 152a of the main layer 152, and is exposed from the facing surface F. The gap adjusting layer 151 is made of a soft magnetic material, such as CoFe or NiFe, having a resistivity lower than that of the main layer 152. Preferably, the gap adjusting layer 151 is made of a soft magnetic material having a resistivity lower than that of the main pole layer 110. The resistivities of the main layer 152 and the main pole layer 110 may be equal or different. In this embodiment, the gap adjusting layer 151 is made of a $Ni_{80}Fe_{20}$ alloy film, and also functions as a seed layer for the main layer 152.

Figure 4B:
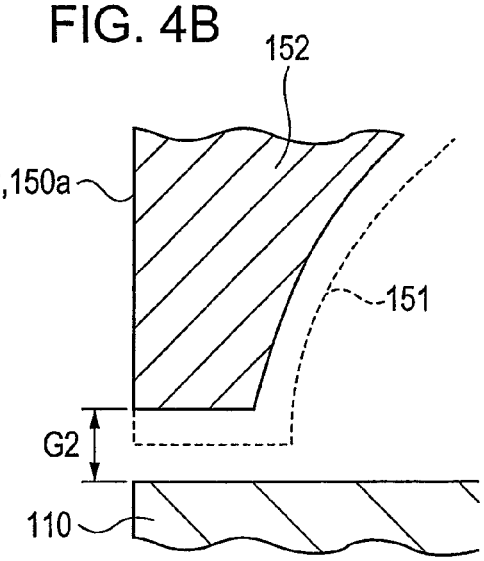

FIGS. 4A and 4B are schematic sectional views that show the operation of the gap adjusting layer 151 during recording. In a low-frequency recording operation, as shown in FIG. 4A, the gap adjusting layer 151 functions together with the main layer 152 to receive magnetic flux ϕ of a recording magnetic field that is emitted from the main pole layer 110 to the recording medium M and returns after passing through the recording medium M (coupling). In this embodiment, a gap G1 is provided between the main pole layer 110 and a lower surface of the gap adjusting layer 151 (an upper surface of the gap layer 113).

In contrast, in a high-frequency recording operation performed by applying a high-frequency current to the coil layers 108 and 115, since the resistivity of the gap adjusting layer 151 is smaller than the resistivities of the main layer 152 and the main pole layer 110, an eddy current loss is caused by the high-frequency current. When an eddy current loss is caused, the magnetic permeability of a side of the gap adjusting layer 151 facing the main pole layer 110 is decreased by a skin effect, and magnetic flux rarely flows to the side. It can be considered that the gap adjusting layer 151 does not exit in a region in which magnetic flux does not flow because of the eddy current loss. Therefore, as shown in FIG. 4B, a gap G2 is provided between a region of the gap adjusting layer 151 in which magnetic flux flows, and the main pole layer 110. As a result, the gap G is virtually increased. When the gap G is virtually increased, magnetic flux ϕ leaking from the main pole layer 110 to the recording medium M is increased, and therefore, the strength of the recording magnetic field can be increased. Moreover, the magnetic writing track width is also increased.

As is well known, an eddy current loss is proportional to the square of the change speed of magnetization, and increases as the frequency of a current (recording current) flowing through the coil layers 108 and 115 increases. Therefore, the magnetic permeability of the side of the gap adjusting layer 151 facing the main pole layer 110 decreases as the frequency of the recording current increases, and the gap adjusting layer 151 behaves to virtually increase the gap G. When the gap G is thus automatically adjusted by the gap adjusting layer 151 in accordance with the frequency of the recording current, a decrease in the magnetic recording track width during high-frequency recording is suppressed. Since magnetic flux leaking from the main pole layer 110 to the recording medium M increases as the frequency of the current flowing through the coil layers 108 and 115 increases, a decrease in the SN ratio during high-frequency recording is also suppressed. Consequently, a stable SN ratio can be achieved.

It is practical that the upper limit of the thickness of the gap adjusting layer 151 is approximately 300 nm. It has been experimentally confirmed that an effect obtained when the thickness of the gap adjusting layer 151 exceeds 300 nm is the same as that obtained when the thickness is 300 nm.

Figure 5:
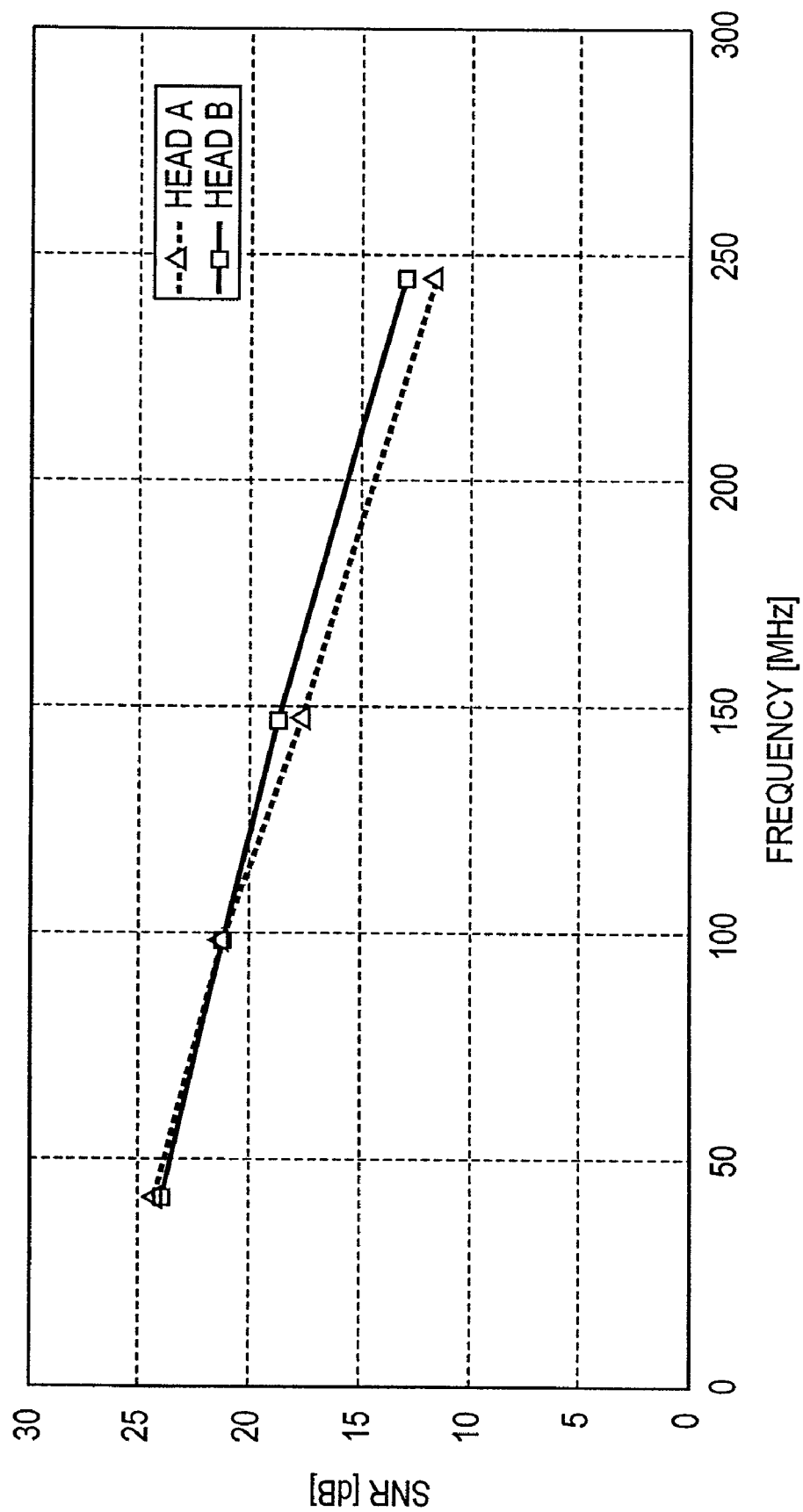
FIG. 5 is a graph showing the relationship between the frequency of a current that flows through a coil layer during recording, and the SN ratio.
Figure 6:
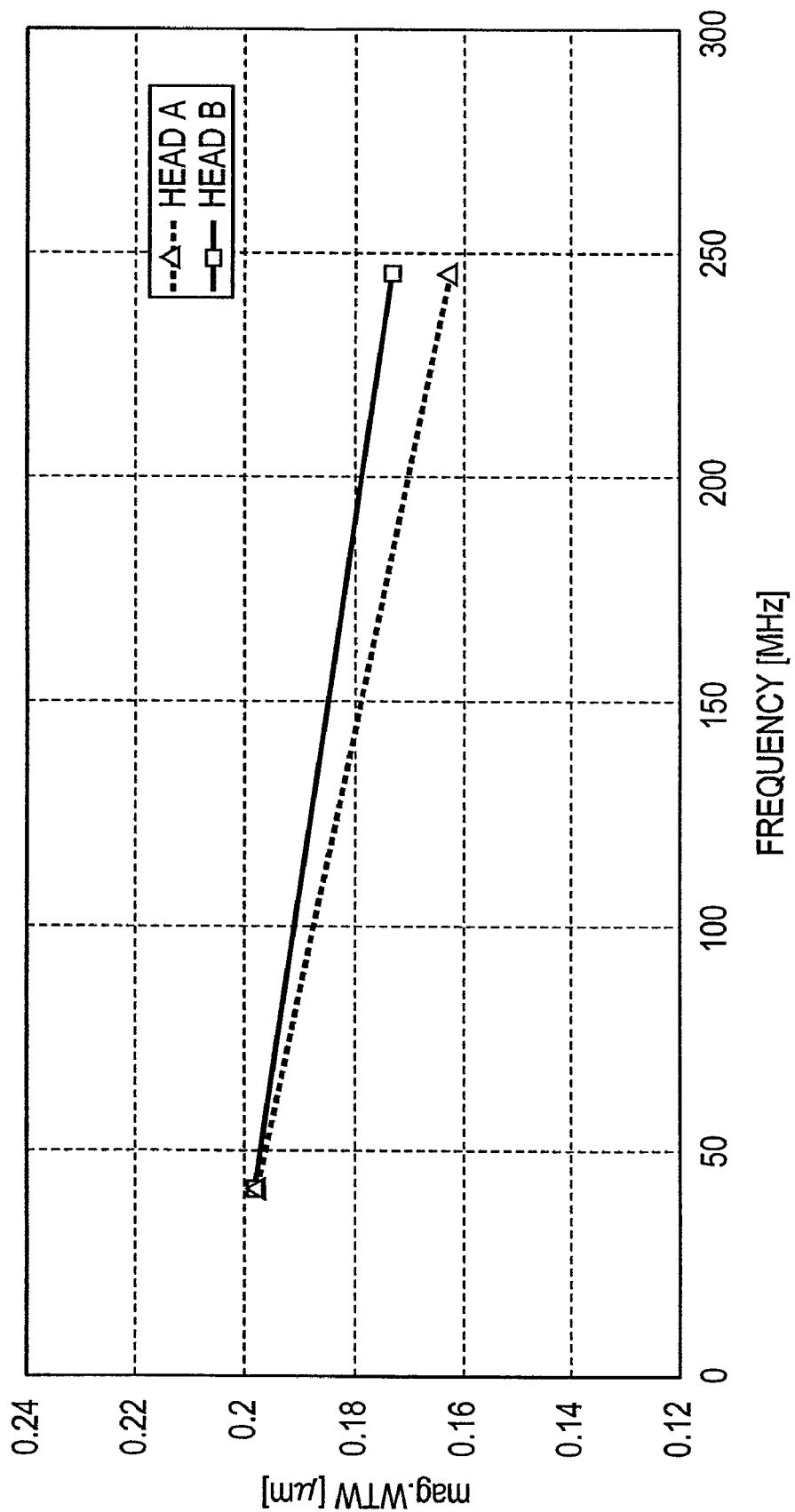
FIG. 6 is a graph that shows the relationship between the frequency of a current flowing through a coil layer during recording, and the magnetic recording track width.

FIGS. 5 and 6 show the results of measurement of changes in the SN ratio (dB) and changes in the magnetic writing track width (μm) depending on the frequency (MHz) of the current applied to the coil layers 108 and 115.

As perpendicular magnetic recording heads to be measured, a perpendicular magnetic recording head A (comparative example) including no gap adjusting layer and a perpendicular magnetic recording head B (example of the present invention) having a return path layer composed of a gap adjusting layer and a main layer were prepared. In FIGS. 5 and 6, a broken line shows the measurement result of the perpendicular magnetic recording head A (comparative example), and a solid line shows the measurement result of the perpendicular magnetic recording head B (example). The layered structure of the perpendicular magnetic recording head A is identical to that of the perpendicular magnetic recording head B except that a gap adjusting layer is not provided. The following materials of a main pole layer and a return path layer are used in the perpendicular magnetic recording heads A and B. Herein, Bs represents the saturation magnetic flux density (unit: G), and ρ represents the resistivity (unit: Ω·m).

Comparative Example

Perpendicular Magnetic Recording Head A

Main pole layer: a $Fe_{80}Ni_{14}Co_6$ alloy (Bs=2.1, $\rho_M$=35), 300 nm

Return Path Underlayer: a $Ni_{50}Fe_{50}$ alloy (Bs=1.5, $\rho_B$=50), 300 nm

Return Path Layer: a $Ni_{30}Fe_{70}$ alloy (Bs=1.8, $\rho_R$=32), 1600 nm

The resistivities $\rho_M$, $\rho_B$, and $\rho_R$ of the main pole layer, the return path underlayer, and the return path layer have the following relation ship:

$\rho_R < \rho_M < \rho_B$

Example

Perpendicular Magnetic Recording Head B

Main pole layer: a $Fe_{80}Ni_{14}Co_6$ alloy (Bs=2.1, $\rho_M$=35), 300 nm

Return Path Layer:

Gap Adjusting Layer: a $Ni_{80}Fe_{20}$ alloy (Bs=1, $\rho_G$=20), 300 nm

Main Layer: a $Ni_{30}Fe_{70}$ alloy (Bs=1.8, $\rho_R$=32), 1600 nm

The resistivities $\rho_M$, $\rho_G$, and $\rho_R$ of the main pole layer, the gap adjusting layer, and the main layer have the following relationship:

$$\rho_G < \rho_R < \rho_M$$

The following recording conditions are common to the perpendicular magnetic recording heads A and B.

Rotating Speed: 5400 rpm
Radius: 22 mm
Skew Angle: 0°
IW (recording current): 40 mA
Ib (read bias current): 140 mV As shown in FIGS. 5 and 6, in the example (perpendicular magnetic recording head B) of the invention, decreases in the SN ratio and the magnetic writing track width are more suppressed and the SN ratio is higher than in the comparative example (perpendicular magnetic recording head A).

Figure 7:
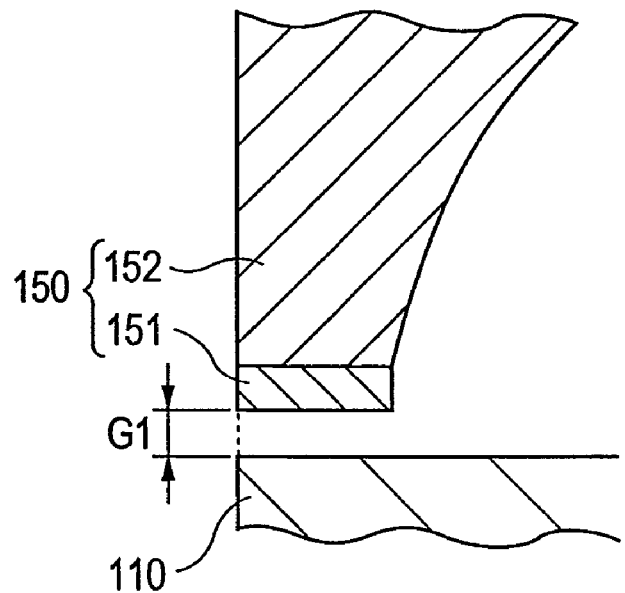
FIG. 7 is a schematic sectional view of a modification of the gap adjusting layer shown in FIGS. 4A and 4B.
Figure 8:
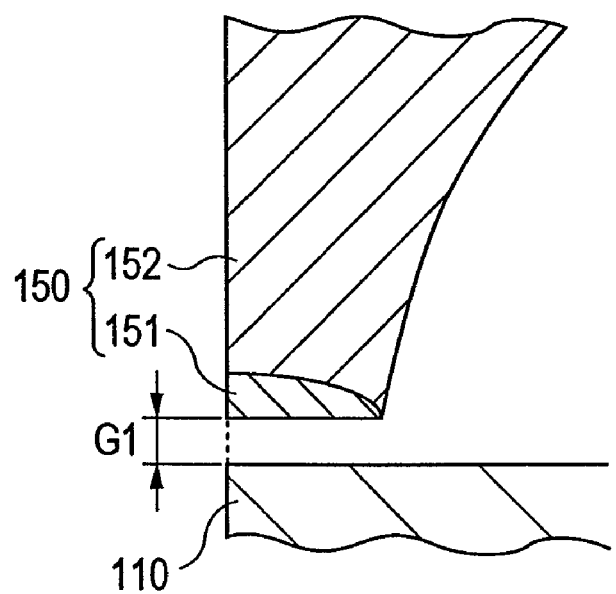
FIG. 8 is a schematic sectional view of another modification of the gap adjusting layers shown in FIGS. 4 and 7.

While the gap adjusting layer 151 is provided directly under almost the entire surface of the main layer 152 so as to function as a seed layer for the main layer 152 in the above-described embodiment, it does not always need to be provided under almost the entire surface of the main layer 152. It is satisfactory as long as the gap adjusting layer 151 faces at least the recording medium M and the main pole layer 110, as shown in FIGS. 7 and 8.

While the return path layer 150 has a two-layer structure including the gap adjusting layer 151 and the main layer 152 in the above-described embodiment, it may have a multilayer structure including three or more layers. In this case, the layers are arranged from a side facing the main pole layer 110 in order of increasing resistivity so that an eddy current loss is produced easily.

What is claimed is:

1. A perpendicular magnetic recording head comprising:
a main pole layer;
a return path layer; and
a coil layer,
wherein the return path layer includes a gap adjusting layer and a main layer, and wherein the gap adjusting layer is made of a magnetic material having a resistivity lower than resistivities of the main layer and the main pole layer.

2. The perpendicular magnetic recording head according to claim 1, wherein the main pole layer is exposed from a medium-facing surface of the recording head that faces a recording medium.

3. The perpendicular magnetic recording head according to claim 2, wherein the return path layer is exposed from the medium-facing surface and faces the main pole layer with a predetermined gap therebetween at the medium-facing surface.

4. The perpendicular magnetic recording head according to claim 1, wherein the coil layer applies a recording magnetic field to the main pole layer and the return path layer.

5. The perpendicular magnetic recording head according to claim 1, wherein the gap adjusting layer and the main layer are stacked in that order from a side that faces the main pole layer.

6. The perpendicular magnetic recording head according to claim 1, wherein the gap adjusting layer faces the main pole layer and the recording medium.

7. The perpendicular magnetic recording head according to claim 5, wherein the gap adjusting layer is positioned so as to face the main pole layer and a recording medium.

8. The perpendicular magnetic recording head according to claim 5, wherein the gap adjusting layer is made of a magnetic material having a resistivity lower than resistivities of the main layer and the main pole layer.

9. The perpendicular magnetic recording head according to claim 1, wherein the return path layer comprises three or more layers.

10. The perpendicular magnetic recording head according to claim 1, wherein the layers are arranged from a side that faces the main pole layer in order of increasing resistivity.

11. The perpendicular magnetic recording head according to claim 1, wherein the gap adjusting layer faces at least the recording medium and the main pole layer.

12. The perpendicular magnetic recording head according to claim 1, wherein the gap adjusting layer is provided under the entire surface of the main layer.

13. The perpendicular magnetic recording head according to claim 1, wherein the gap adjusting layer is provided under a portion of the main layer.

14. The perpendicular magnetic recording head according to claim 1, wherein the gap adjusting layer has a thickness of 300 nm or less.

15. A perpendicular magnetic recording head comprising:
a main pole layer exposed from a medium-facing surface of the recording head facing a recording medium;
a return path layer exposed from the medium-facing surface and facing the main pole layer with a predetermined gap therebetween at the medium-facing surface; and
a coil layer for applying a recording magnetic field to the main pole layer and the return path layer,
wherein the return path layer includes a gap adjusting layer and a main layer stacked in that order from a side facing the main pole layer, and
wherein the gap adjusting layer is positioned so as to face the main pole layer and the recording medium, and is made of a magnetic material having a resistivity lower than resistivities of the main layer and the main pole layer.

16. The perpendicular magnetic recording head according to claim 15, wherein the gap adjusting layer has a thickness of 300 nm or less.

* * * * *